United States Patent Office 3,011,889
Patented Dec. 5, 1961

3,011,889
OXIDATION RESISTANT ALLOY
Sanford Baranow, Mason, Ohio, assignor to General Electric Company, a corporation of New York
No Drawing. Filed Sept. 25, 1959, Ser. No. 842,520
1 Claim. (Cl. 75—176)

This invention relates to high temperature, oxidation resistant alloys and, more particularly, to ternary alloys of chromium, thorium and yttrium.

Alloys which afford good oxidation resistance at temperatures in excess of 2000° F. are desirable for cladding molybdenum, tungsten and chromium base alloys for subsequent use in air at such elevated temperatures. Oxidation resistant nickel base alloys are limited to temperature not in excess of 2000° F. Diffusion limits the use of iron base alloys as a cladding for chromium base alloys. Nickel base alloys are not compatible with chromium base alloys, while iron base alloys are not compatible with tungsten. Both nickel base and iron base alloys form intermetallic composites with molybdenum. Thus, the problem existed to develop alloys which were compatible with molybdenum, tungsten and chromium, and which were oxidation resistant at temperatures in excess of 2000° F.

In copending application, Serial No. 710,367, filed January 21, 1958, now Patent No. 2,955,937, granted October 11, 1960, in the names of James A. McGurty, John J. Collins and Vincent P. Calkins, for "Oxidation Resistant Chromium Alloy," binary alloys are disclosed and claimed which consist of from about 0.2 weight percent to about 2.5 weight percent yttrium with the balance being chromium. Chromium base alloys with small amounts of yttrium are stable in air to temperatures in excess of 2000° F.

The invention of the present application provides oxidation resistant chromium-thorium-yttrium alloys useful in air at temperatures in excess of 2000° F. The alloys extend the life several-fold of the binary chromium-yttrium alloys set forth in the above copending application.

It is an object of my invention to provide an oxidation resistant alloy of chromium, thorium and yttrium.

It is a further object of my invention to provide an alloy which has superior oxidation resistance at temperatures in excess of 2000° F.

It is another object of my invention to provide a cladding alloy which is compatible with molybdenum, tungsten and chromium.

In carrying out my invention in one form, from 0.2 to 2.0 weight percent yttrium, and from 0.05 to 0.4 weight percent thorium are combined with chromium to provide a high temperature, oxidation resistant alloy.

These and various other objects, features and advantages of the invention will be better understood from the following description.

I discovered unexpectedly that small additions of thorium and yttrium to chromium produced alloys which had superior oxidation resistance in air at temperatures in excess of 2000° F. Furthermore, such alloys were compatible with the desired base metals of molybdenum, tungsten, and chromium. I found that the addition of from 0.05 to 0.4 weight percent thorium, and from 0.2 to 2.0 weight percent yttrium, to chromium provided these extraordinary effects. While these weight percents of thorium and yttrium improved the oxidation resistance of this ternary alloy, 0.2 weight percent thorium and 1.0 weight percent yttrium appeared to be the optimum amount of these additions to chromium.

During the research which led to the discovery of these oxidation resistant chromium alloys, a series of small vacuum melted chromium-thorium-yttrium buttons were prepared. Alloy buttons containing from 0.05 to 0.4 weight percent thorium and from .05 to 2.0 weight percent yttrium were heated in air at 2300° F. and at 2500° F. for 100 hours. Additionally, at least one of the above buttons was rolled into a sheet of 12 mils thickness. The specimens were then examined metallographically, and weight changes measured. The data tabulated in Tables I and II show the oxidation resistance superiority of these chromium base alloys containing thorium and yttrium additions as compared with chromium and some other chromium base alloys.

TABLE I

*Oxidation resistance of chromium base alloys*

[100 hours, air, 2300° F.]

| Additions: | Weight gain, mg./cm.$^2$ |
|---|---|
| 100% Cr | 150.0 |
| Cr—0.5Y | 3.7 |
| Cr—1.0Y | 3.0 |
| Cr—0.1Th—0.2Y | 4.2 |
| Cr—0.1Th—0.5Y | 2.5 |
| Cr—0.1Th—1.0Y | 2.5 |
| Cr—0.2Th—1.0Y | 0.4 |

TABLE II

*Oxidation resistance of chromium base alloys*

[100 hours, air, 2500° F.]

| Additions: | Weight gain, mg./cm.$^2$ |
|---|---|
| Cr—1Y | 9.7 |
| Cr—0.2Th—1Y | 5.0 |

While other modifications of this invention which may be employed within the scope of the invention have not been described, the invention is intended to include all such as may be embraced within the following claims.

What I claim as new and desire to secure by Letters Patent of the United States is:

A ternary alloy of chromium, thorium and yttrium which consists of 1.0 weight percent yttrium, 0.2 weight percent thorium, and the balance being chromium.

References Cited in the file of this patent

UNITED STATES PATENTS

| 2,163,354 | Schmidt et al. | June 20, 1939 |
| 2,955,937 | McGurty et al. | Oct. 11, 1960 |

OTHER REFERENCES

Hampel: Rare Metals Handbook, 1954, page 448. Published by Reinhold Publishing Corp., New York, N.Y.